(12) United States Patent  
Kakuta

(10) Patent No.: US 8,177,015 B2  
(45) Date of Patent: May 15, 2012

(54) MOTORCYCLE

(75) Inventor: Wataru Kakuta, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 546 days.

(21) Appl. No.: 12/403,148

(22) Filed: Mar. 12, 2009

(65) Prior Publication Data

US 2009/0260910 A1   Oct. 22, 2009

(30) Foreign Application Priority Data

Apr. 22, 2008 (JP) ................................. 2008-111333  
Aug. 27, 2008 (JP) ................................. 2008-218472

(51) Int. Cl.  
*B60K 13/04* (2006.01)  
*F01N 13/08* (2010.01)

(52) U.S. Cl. .................... 180/296; 180/219; 181/228

(58) Field of Classification Search .............. 180/309, 180/291, 296, 218, 219, 225, 229, 68.3, 89.2; 181/228, 249, 182

See application file for complete search history.

(56) References Cited

U.S. PATENT DOCUMENTS

| | | | | |
|---|---|---|---|---|
| 3,949,829 A * | 4/1976 | Honda et al. | ................... | 181/227 |
| 4,359,865 A * | 11/1982 | Nakao et al. | .................... | 60/313 |
| 4,690,236 A * | 9/1987 | Shinozaki et al. | ............ | 180/219 |
| 4,799,569 A * | 1/1989 | Hattori et al. | ................. | 180/219 |
| 4,800,979 A * | 1/1989 | Tatsuji | .......................... | 180/227 |
| 5,016,725 A * | 5/1991 | Muramatsu | .................... | 180/225 |
| 6,247,305 B1 * | 6/2001 | Bassani | ............................ | 60/312 |
| 6,334,501 B1 * | 1/2002 | Kawamoto | .................... | 180/309 |
| 6,591,935 B1 * | 7/2003 | Petley | ............................ | 180/309 |
| 6,675,933 B2 * | 1/2004 | Yamaguchi | .................... | 181/227 |
| 6,679,347 B2 * | 1/2004 | Iimuro | .......................... | 180/219 |
| 7,318,497 B2 * | 1/2008 | Okunosono | .................... | 181/227 |
| 7,325,651 B2 * | 2/2008 | Kikuchi et al. | ................ | 181/237 |
| 7,364,010 B2 * | 4/2008 | Konno | .......................... | 181/228 |
| 7,549,510 B2 * | 6/2009 | Sakurai et al. | ................ | 181/252 |
| 7,568,548 B2 * | 8/2009 | Fujii et al. | ..................... | 180/309 |
| 7,637,349 B2 * | 12/2009 | Harada | ......................... | 181/265 |
| 7,779,963 B2 * | 8/2010 | Muto | ............................ | 181/252 |
| 7,793,747 B2 * | 9/2010 | Brown | ......................... | 180/219 |
| 7,828,114 B2 * | 11/2010 | Morita et al. | ................. | 181/228 |
| 7,882,700 B2 * | 2/2011 | Yamakura et al. | .............. | 60/323 |
| 8,061,468 B2 * | 11/2011 | Miyashiro et al. | ............. | 180/296 |

(Continued)

FOREIGN PATENT DOCUMENTS

JP   08-312324   11/1996

*Primary Examiner* — John R Olszewski  
*Assistant Examiner* — Jacob Meyer  
(74) *Attorney, Agent, or Firm* — Keating & Bennett, LLP

(57) ABSTRACT

The motorcycle is provided in an embodiment with a vehicle body frame, an engine, and an exhaust pipe connected to the engine. The vehicle body frame has a front frame supporting at least a part of the engine, a left rear frame connected to the front frame and extending rearward of a vehicle body on the left with a center of a vehicle in a horizontal direction as a basis, and a right rear frame extending rearward of the vehicle body on the right. The exhaust pipe has at least a crossing part partially crossing the center of the vehicle in the horizontal direction with a first supporting member mounting a left part of the crossing part to the left rear frame on the left and a second supporting member mounting the right part of the crossing part to the right rear frame on the right.

20 Claims, 7 Drawing Sheets

U.S. PATENT DOCUMENTS

| | | |
|---|---|---|
| 8,074,756 B2* | 12/2011 | Kusaka et al. ............... 180/68.3 |
| 2002/0050415 A1* | 5/2002 | Kawamoto .................... 180/219 |
| 2003/0079938 A1* | 5/2003 | Yamaguchi ................... 181/227 |
| 2004/0129482 A1* | 7/2004 | Takenaka et al. ............. 180/309 |
| 2005/0017531 A1* | 1/2005 | Nagashii ...................... 296/37.1 |
| 2005/0236205 A1* | 10/2005 | Konno .......................... 180/219 |
| 2007/0107968 A1* | 5/2007 | Iwanaga ....................... 180/227 |
| 2007/0181360 A1* | 8/2007 | Nakayama .................... 180/309 |
| 2008/0110687 A1* | 5/2008 | Miyashiro et al. ............ 180/296 |
| 2009/0050392 A1* | 2/2009 | Kakuta .......................... 180/219 |
| 2009/0065280 A1* | 3/2009 | Kakuta et al. ................. 180/296 |
| 2009/0260910 A1* | 10/2009 | Kakuta .......................... 180/296 |
| 2010/0032227 A1* | 2/2010 | Oguri et al. ................... 180/309 |
| 2010/0101886 A1* | 4/2010 | Ishibe ............................ 180/296 |

* cited by examiner

MOTORCYCLE

CROSS-REFERENCE TO RELATED APPLICATIONS

This application is related to and claims priority to Japanese Patent Application Nos. 2008-111333 (filed on Apr. 22, 2008) and 2008-218472 (filed on Aug. 27, 2008), the entire contents of which are incorporated herein by reference in their entirety.

TECHNICAL FIELD

The present invention relates generally to a motorcycle.

BACKGROUND

A motorcycle has a vehicle body frame to ensure the rigidity of a vehicle body while traveling or the like. The vehicle body frame typically has a main frame and a rear frame as an example, with the motorcycle provided with an engine generating a driving force. An exhaust pipe is connected to the engine, with the exhaust pipe discharging exhaust gas. The exhaust pipe is generally mounted to one rear frame of the right and left rear frames of the motorcycle. Thus, a structure described in the following Japanese Patent Application Publication No. 08-312324, for example, has been known as a structure where the exhaust pipe is mounted to only one rear frame (e.g., the right or left rear frame).

However, when the exhaust pipe is mounted to only one rear frame of the right or left rear frames as in the above example (Publication No. 08-312324). Unfortunately, the rigidity of the rear frame is hardly ensured if measures such as the thickening of the rear frame are not taken.

SUMMARY

The present invention in accordance with one or more embodiments is directed, for example, to problems such as described in the above situation. For example for an embodiment, a motorcycle is disclosed having a rear frame having rigidity ensured, such as by a simple method as described further herein.

A motorcycle in accordance with an embodiment of the present invention includes: an engine as a power source; a vehicle body frame which has a front frame supporting at least a part of the engine, a left rear frame connected to the front frame and extending rearward of a vehicle body on the left with a center of a vehicle in a horizontal direction as a basis, and a right rear frame extending rearward of the vehicle body on the right; an exhaust pipe connected to the engine, the exhaust pipe having at least a crossing part partially crossing the center of the vehicle in the horizontal direction and allowing exhaust gas generated in the engine to flow; a first supporting member mounting a left part of the crossing part to the left rear frame on the left relative to the center of the vehicle in the horizontal direction; and a second supporting member mounting a right part of the crossing part to the right rear frame on the right relative to the center of the vehicle in the horizontal direction.

According to one or more embodiments of the present invention, the exhaust pipe is mounted to the left rear frame and the right rear frame to bridge the left rear frame and the right rear frame. Thus, the rigidity of the rear frame may be highly ensured. Furthermore as described herein in accordance with one or more embodiments, the motorcycle having the rear frame having rigidity ensured by the simple method may be provided.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
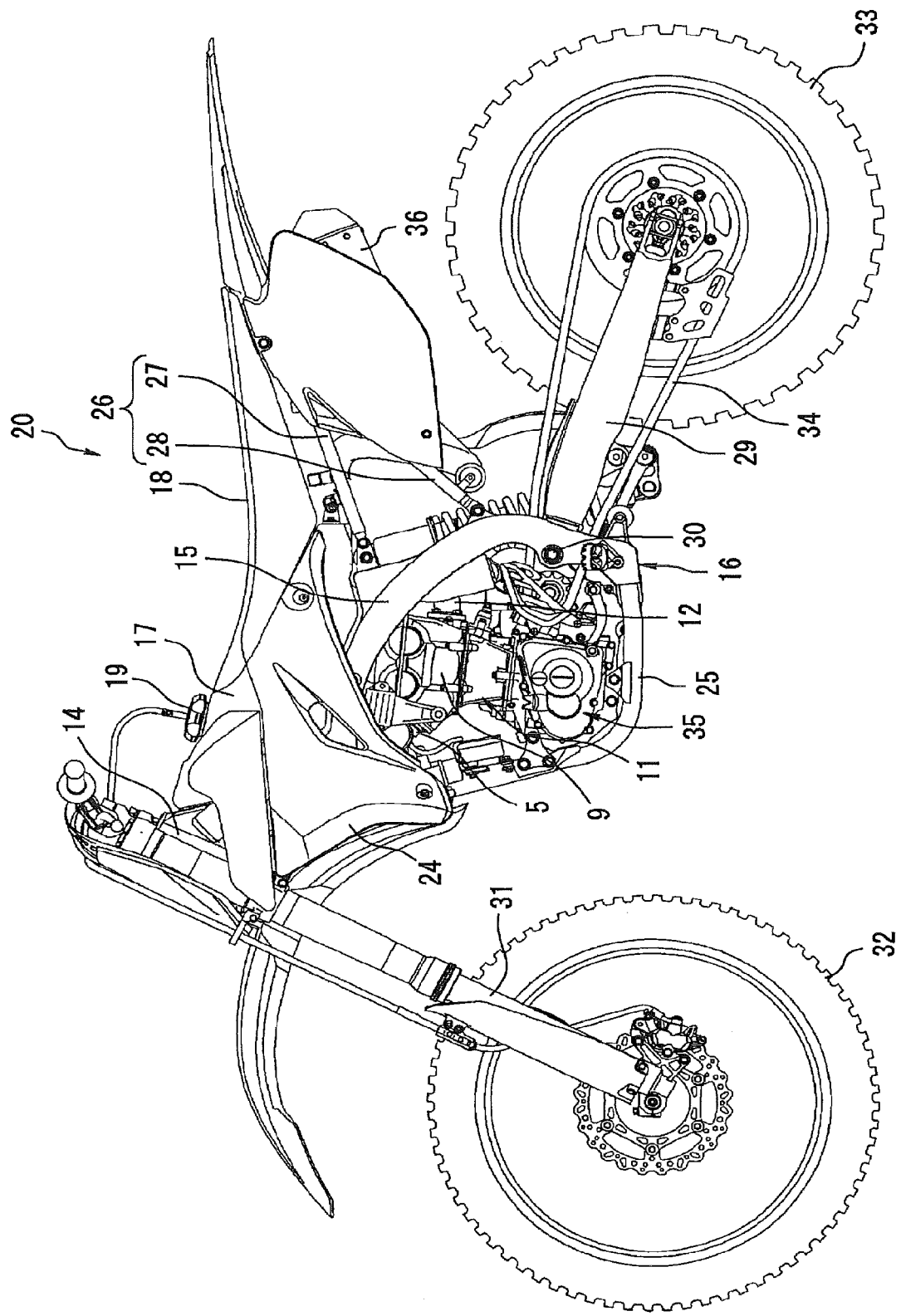
FIG. 1 illustrates a side view of a motorcycle in accordance with an embodiment of the present invention.

The description of various reference numerals and symbols in the drawings may be set forth in accordance with one or more embodiments, for example, as follows: 11: engine, 12: exhaust pipe, 12b: exhaust chamber, 12c: crossing part, 12d: left part, 12e: right part, 15: main frame (front frame), 16: vehicle body frame, 20: motorcycle, 25: down tube (front frame), 26: rear frame, 26L: left rear frame, 26R: right rear frame, 27L: left seat rail (upper side rear frame), 27R: right seat rail (upper side rear frame), 28L: left back stay (lower side rear frame), 28R: right back stay (lower side rear frame), 36: silencer, 51: grommet (buffer member), 61: first supporting member (first supporting member), 62: second supporting member (second supporting member), 63: third supporting member (third supporting member)

Embodiments of the present invention and their advantages are best understood by referring to the detailed description that follows. It should be appreciated that like reference numerals are used to identify like elements illustrated in one or more of the figures.

DETAILED DESCRIPTION

FIG. 1 is a left side view of a motorcycle 20 in accordance with one or more embodiments. First, the schematic structure of the motorcycle 20 will be described with reference to FIG.

1. In the following description, the front, back, left and right directions refer to directions from a rider's reference sitting on a riding seat 18.

The motorcycle 20 is provided with a vehicle body frame 16 forming a framework and the riding seat 18 on which the rider sits. The motorcycle 20 for example may represent a so-called off-road type motorcycle. However, the motorcycle in accordance with one or more embodiments is not limited thereto and may be a motorcycle other than the off-road type motorcycle (e.g., a motorcycle type, a scooter type, or so-called moped type motorcycles or the like).

Figure 2:
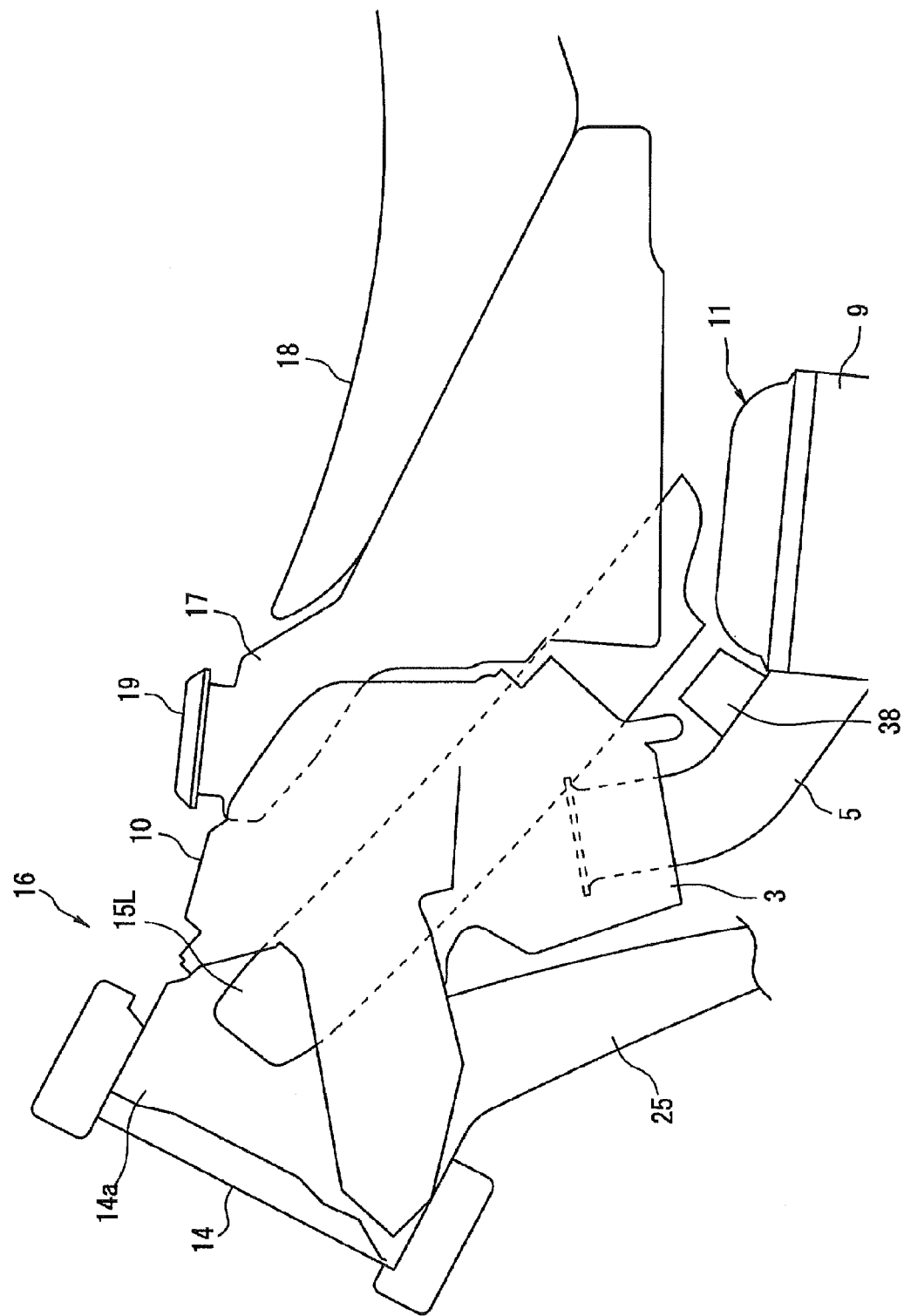
FIG. 2 illustrates a side view of FIG. 1 shown with FIG. 1 partially enlarged in accordance with an embodiment of the present invention.

The vehicle body frame 16 is provided with a head pipe 14, a down tube 25, and a main frame 15. As shown in FIG. 2, the down tube 25 extends downward from a bracket 14*a* of the head pipe 14. On the other hand, the main frame 15 extends rearward from the bracket 14*a* of the head pipe 14 above the down tube 25. The main frame 15 is constituted by a pair of left and right frame members 15L, 15R (not shown) extending rearward from the bracket 14*a* of the head pipe 14. The main frame 15 extends downward as advancing rearward.

As shown in FIG. 1, a pair of left and right seat rails 27 are connected to the main frame 15. The seat rail 27 extends rearward. A back stay 28 is connected to a portion below a portion of the main frame 15 to which the seat rail 27 is connected. The main frame 15 has a lower end part to which a rear arm 29 is connected via a pivot shaft 30.

The head pipe 14 has a lower end connected to a front fork 31. The front fork 31 has a lower end rotatably supporting a front wheel 32. The rear arm 29 has a rear end supporting a rear wheel 33. A cover 24 is disposed on the upper side of the vehicle body frame 16 to cover the vehicle body frame 16. A fuel tank 17 is mounted to the upper parts of the main frame 15 and back stay 28 so as to bridge the main frame 15 and the back stay 28. The fuel tank 17 has an upper surface to which a cap 19 is mounted. The riding seat 18 is provided above the fuel tank 17. Specifically, as shown in FIG. 2, a forward part of the riding seat 18 including at least a front end is located above the fuel tank 17. The forward part of the riding seat 18 including at least the front end is disposed so that the forward part overlaps with a backward part of the fuel tank 17 including at least a rear end in a plan view.

As shown in FIG. 1, a power unit 35 is disposed between the down tube 25 and the main frame 15, the power unit 35 mounted to the down tube 25 and the main frame 15. The power unit 35 is obtained by mutually assembling an engine 11 generating a driving force and a variable speed mechanism or the like to integrate them. The power unit 35 is connected to the rear wheel 33 via a power transmission means 34 such as a chain. Thereby, the driving force generated in the engine 11 is transmitted to the rear wheel 33 via the power transmission means 34.

The engine 11 has a cylinder 9. The cylinder 9 is diagonally erected upward and rearward in a side view. The cylinder 9 may be erected upward in the side view. The cylinder 9 may be diagonally erected upward and forward in the side view. In this embodiment, the engine 11 is a four-cycle single cylinder engine. However, the engine 11 may be a two-cycle engine and may be a multi-cylinder engine.

As shown in FIG. 2, an air intake pipe 5 has a first end part connected to the cylinder 9. The air intake pipe 5 extends diagonally upward from the cylinder 9 in the side view. The air intake pipe 5 extends diagonally forward from the front side of the cylinder 9 in the side view. However, the air intake pipe 5 may extend rearward or diagonally rearward from the rear side the cylinder 9. The air intake pipe 5 has a second end part connected to an air cleaner case 3 of an air cleaner 10. Air supplied to the engine 11 is purified by making the air pass through the air cleaner 10. The air intake pipe 5 may extend in a nearly horizontal direction forward from the front side of the cylinder 9. The air intake pipe 5 has a middle part on which a fuel supply device 38 is provided. The fuel supply device 38 is, for example, a fuel injection device which supplies fuel into the air intake pipe 5, or is a vaporizer sucking up fuel using air flowing in the air intake pipe 5.

As shown in FIG. 1, an exhaust pipe 12 has a first end part connected to the cylinder 9. The exhaust pipe 12 extends rearward toward the diagonal upside from the rear side of the cylinder 9 in the side view. The exhaust pipe 12 has a second end part connected to a silencer 36. The exhaust pipe 12 may extend rearward in a nearly horizontal direction from the rear side of the cylinder 9. Furthermore, the exhaust pipe 12 may be connected to the front side of the cylinder 9. As described later, the exhaust pipe 12 may have a required pipe length and cross-section shape according to the exhaust performance or the output performance of the engine 11. The exhaust pipe 12, which has the required pipe length and cross-section shape, is mounted to an appropriate position in the motorcycle 20.

Figure 3:
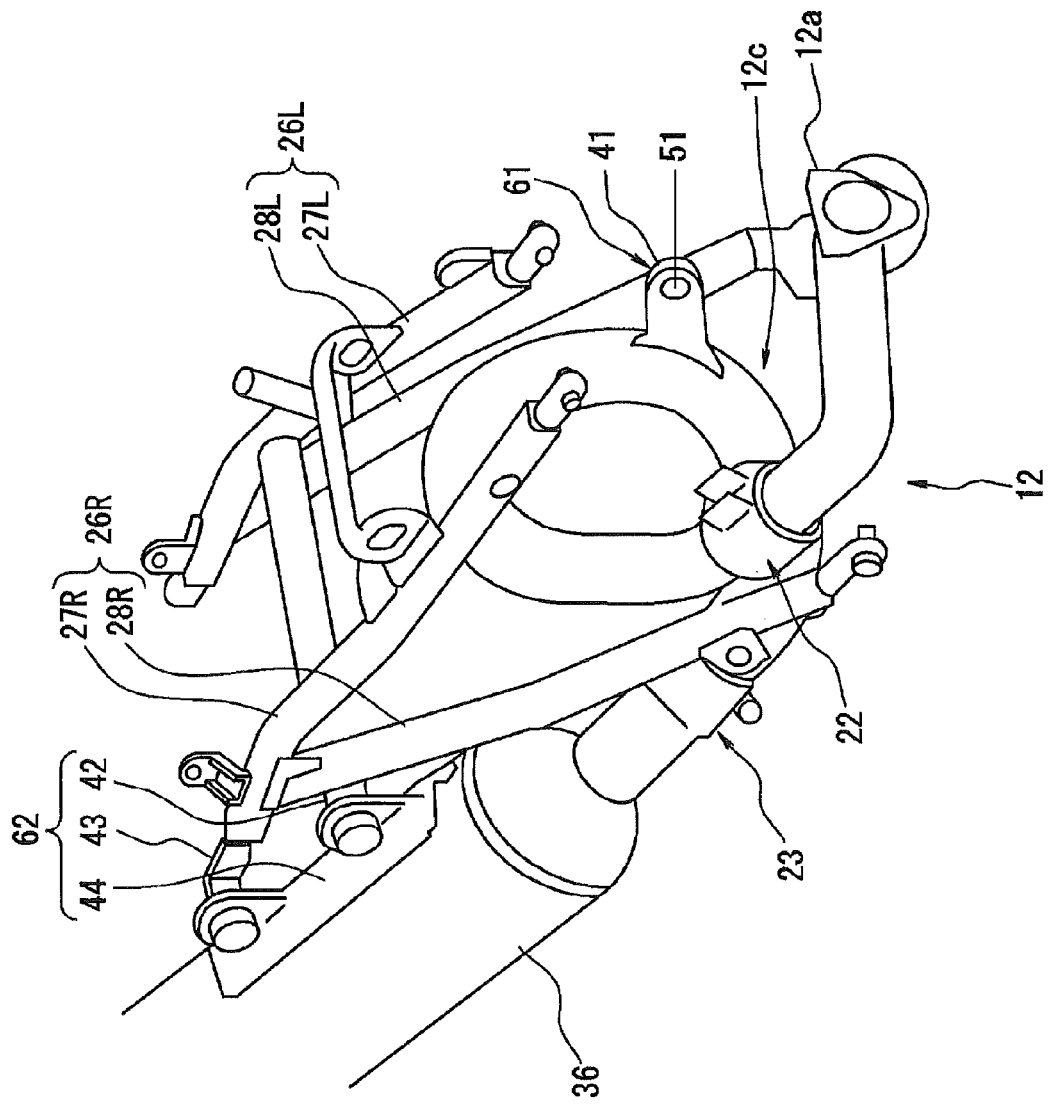
FIG. 3 illustrates a perspective view showing an exhaust pipe or a silencer mounted to a vehicle body frame in accordance with an embodiment of the present invention.

As shown in FIG. 3, the motorcycle 20 is provided with a rear frame 26. The rear frame 26 is configured to include at least the seat rail 27 and the back stay 28. In this embodiment, the seat rail 27 has a pair of left and right pipes of a left seat rail 27L and a right seat rail 27R. However, the seat rail 27 may have further other pipes as needed. The seat rail 27 for example may be not a pipe but a solid rod. In this embodiment, the back stay 28 has a pair of left and right pipes of a left back stay 28L and a right back stay 28R. However, the back stay 28 may have further other pipes as needed. The back stay 28 for example may be not a pipe but a solid rod. In this embodiment, for descriptive purposes, the left seat rail 27L and the left back stay 28L are collectively referred to as a left rear frame 26L, while the right seat rail 27R and the right back stay 28R are collectively referred to as a right rear frame 26R.

The schematic structure of the motorcycle 20 was described above. Next, the structure of the exhaust pipe 12 according to one or more embodiments of the present invention will be described in detail.

—Structure of Exhaust Pipe—

As shown in FIG. 3, the exhaust pipe 12 has a mounting hole 12*a* connected to the engine 11. The exhaust pipe 12 has a downstream end side to which the silencer 36 as a muffler is mounted in the flow direction of exhaust gas. In this embodiment, the exhaust pipe 12 is mounted to the left back stay 28L via a bracket 41. The bracket 41 is welded to, for example, the exhaust pipe 12. A bracket 44 is mounted to the silencer 36. The bracket 44 is welded to, for example, the silencer 36. In this embodiment, the silencer 36, which is mounted to the right back stay 28R via a bracket 42 and the bracket 44, is mounted to the right seat rail 27R via a bracket 43 and the bracket 44. The bracket 42 is welded to, for example, the right back stay 28R. The bracket 43 is welded to, for example, the right seat rail 27R. A nearly round hole which is not shown is formed in the bracket 41, the bracket 42, the bracket 43 and the bracket 44. For example, the hole has a thread groove. The exhaust pipe 12 is fixed to the left back stay 28L, for example, by inserting a bolt which is not shown into the hole. The silencer 36 is fixed to the right back stay 28R, for example, by inserting the bolt into the hole. The silencer 36 is fixed to the right seat rail 27R, for example, by inserting the bolt into the hole.

In the seat rail 27 and back stay 28, the position of the exhaust pipe 12 or silencer 36 mounted is not limited to the position described above. For example, the exhaust pipe 12 may be mounted to the right back stay 28R. The silencer 36 may be mounted to the left back stay 28L and the left seat rail 27L. Furthermore, the silencer 36 may be in a form in which the silencer 36 is not connected to the back stay 28 but is mounted to only the left seat rail 27L or the right seat rail 27R. Alternatively, the silencer 36 may be in a form in which the silencer 36 is not connected to the seat rail 27 but is mounted to only the left back stay 28L or the right back stay 28R.

In this embodiment, the exhaust pipe 12 and the silencer 36 are defined to be mounted to any part of the left rear frame 26L and the right rear frame 26R. That is, the exhaust pipe 12 and the silencer 36, which are not mounted to only the right rear frame 26R, are not mounted to only the left rear frame 26L. In other words, the exhaust pipe 12 is mounted to either the left rear frame 26L or the right rear frame 26R, and the silencer 36 is mounted to the rear frame which is different from the rear frame to which the exhaust pipe 12 is mounted. Specifically, the silencer 36 is mounted to the right rear frame 26R when the exhaust pipe 12 is mounted to the left rear frame 26L. The silencer 36 is mounted to the left rear frame 26L when the exhaust pipe 12 is mounted to the right rear frame 26R.

As shown in FIG. 3, the exhaust pipe 12 is disposed between the left back stay 28L and the right back stay 28R in the horizontal direction (in other words, in the plan view). However, the exhaust pipe 12 may be disposed between the left seat rail 27L and the right seat rail 27R in accordance with the difference in the structure of the rear frame 26 including the seat rail 27 and the back stay 28. The difference in the structure of the rear frame 26 means, for example, the case in which the distance between the left seat rail 27L and the right seat rail 27R is larger than the distance between the left back stay 28L and the right back stay 28R.

Figure 4:
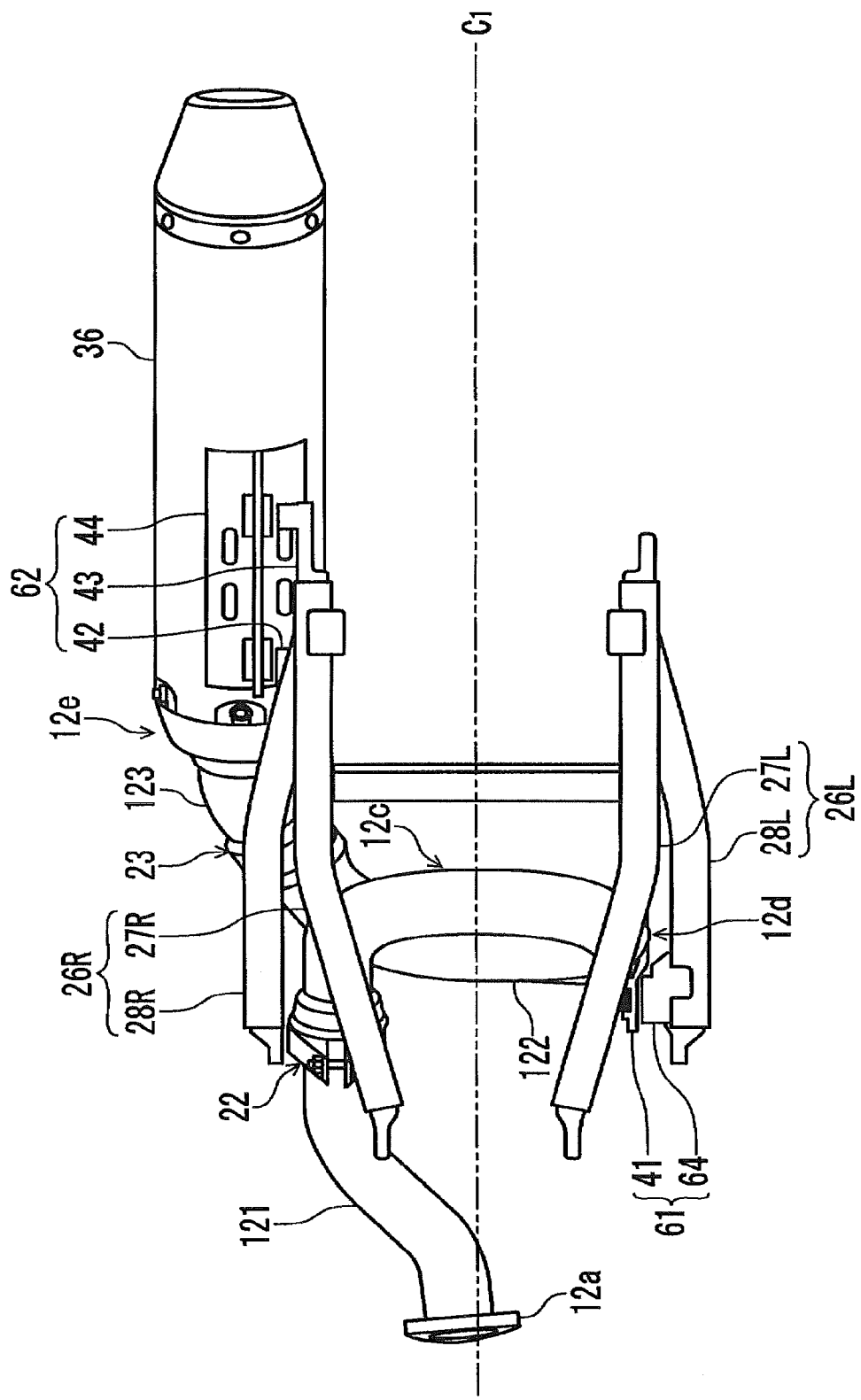
FIG. 4 illustrates a diagram showing an exhaust pipe or a silencer mounted to a vehicle body frame when viewed from the upper side of the vehicle body of a motorcycle in accordance with an embodiment of the present invention.

The exhaust pipe 12 has at least a crossing part 12c partially crossing the center in the horizontal direction. As shown in FIG. 4, the crossing part 12c crosses a vehicle body central line $C_1$ of the motorcycle 20 in the horizontal direction. The crossing part 12c is disposed between the left back stay 28L and the right back stay 28R in the horizontal direction. The crossing part 12c crosses the vehicle body central line $C_1$ at least once between the outer side ends of the exhaust pipe 12 and the silencer 36 in the horizontal direction (a vertical direction of FIG. 4). As shown in FIG. 4 or the like, the crossing part 12c according to this embodiment crosses the vehicle body central line $C_1$ twice.

The crossing part 12c has a left part 12d mounted to the left rear frame 26L by a first supporting member 61. The crossing part 12c has a right part 12e mounted to the right rear frame 26R by a second supporting member 62. A left part 12d of the crossing part 12c is located on the left in the horizontal direction with the vehicle body central line $C_1$ in the crossing part 12c as the basis. The right part 12e of the crossing part 12c is located on the right in the horizontal direction with the vehicle body central line $C_1$ in the crossing part 12c as the basis. As shown in FIG. 4, the first supporting member 61 is formed by the bracket 41 and the bracket 64. The bracket 64 is welded to, for example, the left back stay 28L. The second supporting member 62 is formed by the bracket 42, the bracket 43 and the bracket 44. The first supporting member 61 and the second supporting member 62 may be integrated with the exhaust pipe 12. Alternatively, either the first supporting member 61 or the second supporting member 62 may be integrated with the exhaust pipe 12.

For example, a grommet 51 as a buffer member is provided in the hole of the bracket 41, the grommet 51 made of rubber. When the grommet 51 is provided in the bracket 41, the hole may not have the thread groove.

When the exhaust pipe 12 or the silencer 36 is mounted, the buffer member is not limited to the grommet 51. As the buffer member, a grommet 51 may be provided in the bracket 42.

Alternatively, as the buffer member, a grommet 51 may be provided in the bracket 43. Alternatively, the grommet 51 may be selectively provided in the bracket 41, the bracket 42, and/or the bracket 43. The material of the buffer member is not limited to rubber. The material of the buffer member is not particularly limited as long as the buffer member exhibits effects which will be described later.

Figure 5:
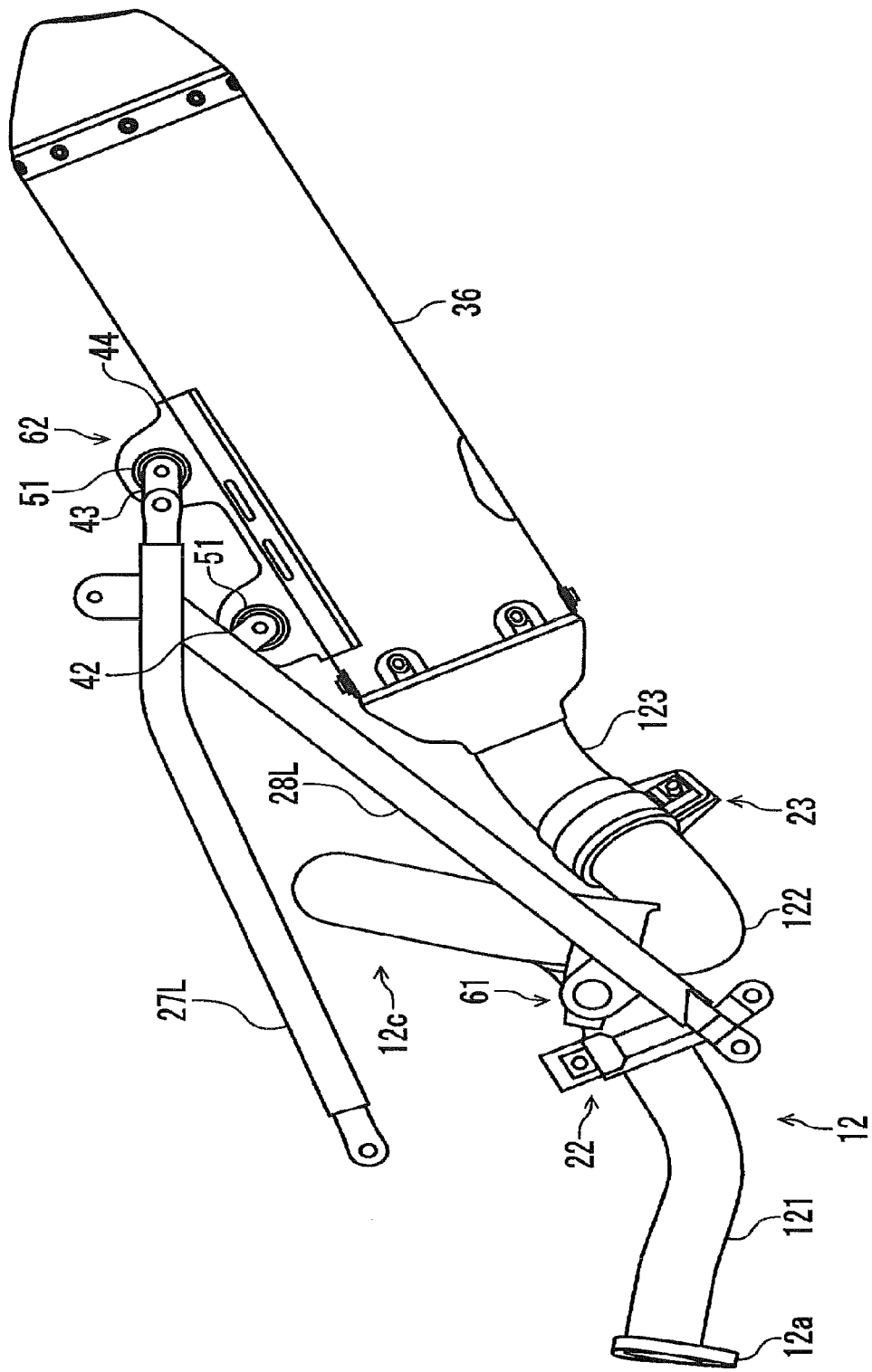
FIG. 5 illustrates a side view showing the exhaust pipe or the silencer mounted to the vehicle body frame in accordance with an embodiment of the present invention.

The exhaust pipe 12 is formed by at least a forward pipe 121, a bending pipe 122, and a silencer joining pipe 123 in the length direction. As shown in FIG. 4 or 5, a first joining part 22 is formed between the forward pipe 121 and the bending pipe 122. A second joining part 23 is formed between the bending pipe 122 and the silencer joining pipe 123. The crossing part 12c is formed by at least the bending pipe 122. The silencer 36 is mounted to the exhaust pipe 12 by joining the silencer joining pipe 123 to the silencer 36.

As described above, the left part 12d of the crossing part 12c is mounted to the left back stay 28L via the first supporting member 61. Thereby, the exhaust pipe 12 can be connected to the left rear frame 26L. The right part 12e of the crossing part 12c is mounted to the right seat rail 27R or the right back stay 28R via the second supporting member 62. That is, the silencer 36, which is mounted to the right back stay 28R via the bracket 42 and the bracket 44, is mounted to the right seat rail 27R via the bracket 43 and the bracket 44. The silencer 36 is mounted to the exhaust pipe 12 by joining the silencer joining pipe 123 to the exhaust pipe 12. Thereby, the silencer 36 can be connected to the right rear frame 26R. That is, the silencer 36 is connected to the right rear frame 26R by mounting the right part 12e of the crossing part 12c to the right rear frame 26R.

As shown in FIG. 3 or 4, a part of the exhaust pipe 12 has a once-rolled shape. However, the form in which the exhaust pipe 12 is rolled is not limited to the above one. The number of rollings of the exhaust pipe 12 or the like is defined as the number in accordance with the exhaust performance by the flow of exhaust gas or the output performance of the engine 11. That is, the exhaust pipe 12 is rolled at proper curvature in view of the pipe length so that the exhaust performance or the output performance of the engine 11 becomes within a prescribed performance.

In the exhaust pipe 12, the bending pipe 122 has a shape made by rolling the pipe once or more. As shown in FIG. 4, the first joining part 22 is disposed on the right relative to the center in the horizontal direction. The bending pipe 122 crosses the vehicle body central line $C_1$ toward the left from the right. The bending pipe 122 has a left end mounted to the left back stay 28L by the first supporting member 61. The bending pipe 122 crosses the vehicle body central line $C_1$ toward the right from the left on the downstream side in the flow direction of exhaust gas relative to a position of the bending pipe 122 mounted to the left back stay 28L by the first supporting member 61.

In this embodiment, the material of the exhaust pipe 12 is mainly steel. The material of the rear frame 26 is mainly aluminum. Therefore, the exhaust pipe 12 has a sufficient strength in comparison with that of the rear frame 26. A diameter of a portion of the vehicle body frame 16 which is equivalent to the rear frame 26 is generally smaller than that of the exhaust pipe 12. Even in this embodiment, the thickness of the rear frame 26 is thinner than that of the exhaust pipe 12.

As shown in FIG. 2, the air cleaner 10 is diagonally disposed above the front of the engine 11. When the air cleaner 10 is disposed to the rear of the engine 11, the air cleaner 10 can be mounted to the seat rail 27 or the back stay 28. When the air cleaner 10 is mounted to the rear frame 26 containing the seat rail 27 and the back stay 28, the rigidity of the rear frame 26 is highly ensured by the main body of the air cleaner 10.

As described above, in this embodiment, the exhaust pipe 12 is mounted to the left rear frame 26L and the right rear frame 26R. The motorcycle 20 can highly ensure the rigidity of the rear frame 26 in comparison with the example in which the exhaust pipe 12 is mounted only to either the left rear frame 26L or the right rear frame 26R.

The left rear frame 26L, which extends rearward of the vehicle body on the left with the center of the vehicle in the horizontal direction as the basis, is connected to the main frame 15. The right rear frame 26R, which extends rearward of the vehicle body on the right with center of the vehicle in the horizontal direction as the basis, is connected to the main frame 15. The main frame 15 supports at least a part of the engine 11. The exhaust pipe 12 is connected to the engine 11, and the exhaust gas generated in the engine 11 flows in the exhaust pipe 12. The exhaust pipe 12 has at least the crossing part 12c partially crossing the vehicle body central line $C_1$ in the horizontal direction. Furthermore, the motorcycle 20 is provided with the first supporting member 61 mounting the left part 12d of the crossing part 12c to the left rear frame 26L on the left relative to the vehicle body central line $C_1$, and the second supporting member 62 mounting the right part 12e of the crossing part 12c to the right rear frame 26R on the right relative to the vehicle body central line $C_1$. That is, the exhaust pipe 12 is mounted to the rear frame 26 so as to bridge the left rear frame 26L and the right rear frame 26R. Thereby, the rigidity of the rear frame 26 is highly ensured.

The exhaust pipe 12 is connected to the rear part of the engine 11 in the side view of the vehicle body. When the exhaust pipe 12 is connected to the front of the engine 11 and the exhaust pipe 12 extends rearward from the front of the vehicle body of the motorcycle 20 unlike in this embodiment, the pipe length of the exhaust pipe 12 can be believed to be sufficiently ensured. However, when the exhaust pipe 12 is connected to the rear part of the engine 11 and the exhaust pipe 12 extends rearward of the vehicle body of the motorcycle 20, it may be difficult to sufficiently ensure the pipe length of the exhaust pipe 12. However, according to this embodiment, the exhaust pipe 12 is mounted to the left rear frame 26L and the right rear frame 26R, and the exhaust pipe 12 is bent to the right and the left. Therefore, the pipe length of the exhaust pipe 12 is sufficiently ensured.

As shown in FIG. 3, the exhaust pipe 12 is rolled once or more. Thus, the pipe length of the exhaust pipe 12 is sufficiently ensured by rolling the exhaust pipe 12.

In this embodiment, the exhaust pipe 12 has the silencer 36 on the downstream end side of the exhaust gas. The silencer 36 is connected to either the left rear frame 26L or the right rear frame 26R, and the exhaust pipe 12 is connected to the other rear frame. In FIG. 3, the silencer 36 is connected to the right rear frame 26R, and the exhaust pipe 12 is connected to the left rear frame 26L. A portion of the exhaust pipe 12 joined to the engine 11 and the silencer 36 is bent at proper curvature from the right rear frame 26R to which the silencer 36 is mounted to the left rear frame 26L. Thereby, the pipe length of the exhaust pipe 12 is sufficiently ensured. In comparison with the case in which the exhaust pipe 12 and the silencer 36 are both mounted only to the left or right side of the rear frame 26, the weight balance of left and right sides of the motorcycle 20 can be uniformly adjusted.

In the motorcycle 20, the buffer member such as the grommet 51 can be provided for the connection between the exhaust pipe 12 and the rear frame 26. The provision of the buffer member such as the grommet 51 can absorb vibration caused by the traveling of the motorcycle 20 and exhaust pulsation in the exhaust pipe 12, or the like. The provision of the buffer member such as the grommet 51 can absorb a dimensional tolerance when mounting the exhaust pipe 12 or the silencer 36. Therefore, the exhaust pipe 12 or the silencer 36 may be easily mounted.

In this embodiment, the exhaust pipe 12 is disposed between the left rear frame 26L and the right rear frame 26R. Thereby, the exhaust pipe 12 is not expanded outward of the vehicle body, and the width of the entire vehicle can be reduced. Therefore, the exhaust pipe 12 is prevented from being externally damaged from the outer side of the vehicle body.

In this embodiment, the left rear frame 26L has the left seat rail 27L as the upper side rear frame. The left rear frame 26L has the left back stay 28L as the lower side rear frame. On the other hand, the right rear frame 26R has the right seat rail 27R as the upper side rear frame, and has the right back stay 28R as the lower side rear frame. Therefore, the mounting position of the exhaust pipe 12 is properly selected in the rear frame 26 including the left seat rail 27L, the right seat rail 27R, the left back stay 28L, and the right back stay 28R. A space occupied by the rear frame 26 can be effectively used by properly selecting the mounting position of the exhaust pipe 12 in the rear frame 26. The mounting position of the exhaust pipe 12 can be properly selected in the rear frame 26 to prevent the resonance based on the vibration characteristics of the engine 11 or the like.

In one or more embodiments discussed above, the exhaust pipe 12 had the once-rolled shape such as shown in FIG. 3. However, various modifications may be implemented in accordance with one or more embodiments. For example for a modification (e.g., modification 1), the exhaust pipe 12 may be in a form of a bent shape instead of the rolled shape. Members exhibiting the same operations as those of the embodiment are designated by the same reference numerals, and the description thereof is omitted.

Figure 6:
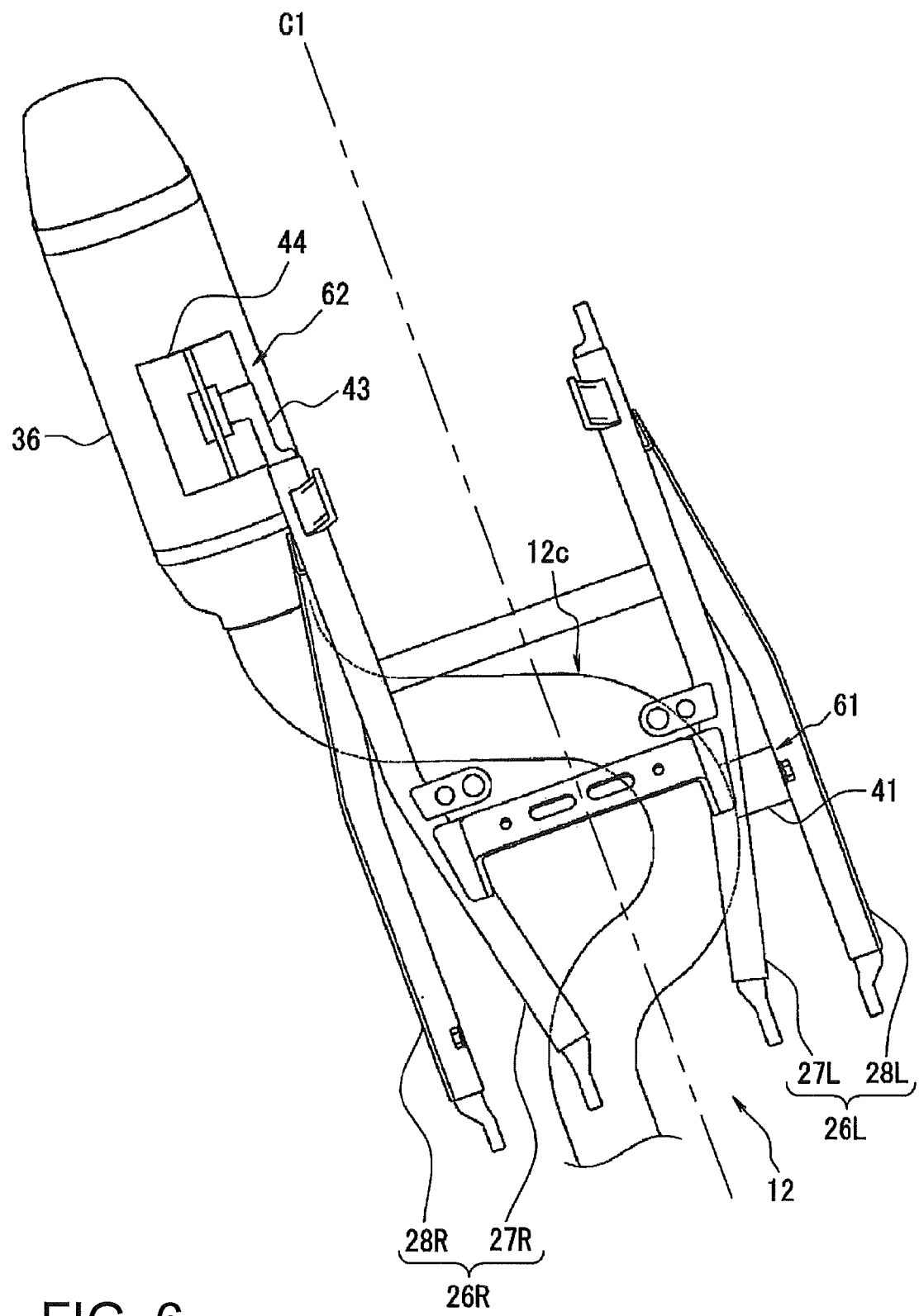
FIG. 6 illustrates a diagram showing an exhaust pipe or a silencer mounted to a vehicle body frame according to a modification 1 when viewed from the upper side of a vehicle body of a motorcycle in accordance with an embodiment of the present invention.

As shown in FIG. 6, the exhaust pipe 12 is mounted to the left back stay 28L via the bracket 41. The silencer 36 is mounted to the right seat rail 27R via the bracket 44 and a bracket 43. However, as shown in FIG. 3, the silencer 36 may be mounted to the right seat rail 27R and the right back stay 28R via the bracket 44 and the bracket 43, and via the bracket 44 and the bracket 42.

The mounting position or the like of the exhaust pipe 12 in the rear frame 26 is not limited to the above examples. The descriptions of the mounting position of the exhaust pipe 12 in the rear frame 26 and position of the provided buffer member, which may be the same as those of the embodiments discussed herein, and therefore are omitted and not repeated. The exhaust pipe 12 is bent at proper curvature in view of the pipe length so that the exhaust performance or the output performance of the engine 11 becomes within a prescribed performance. Even in this modification, as in the embodiment, the exhaust pipe 12 and the silencer 36 are not mounted to only the right rear frame 26R or only the left rear frame 26L, but rather to both. Even in this modification, as in the embodiment, the exhaust pipe 12 is disposed between the left back stay 28L and the right back stay 28R.

The exhaust pipe 12 is observed to the downstream side from the upstream side in the flow direction of the exhaust gas. The crossing part 12c is bent to the left from the right in the horizontal direction from the rearward of the engine 11. Thereby, the crossing part 12c crosses the vehicle body central line $C_1$ toward the left from the right. The left end of the crossing part 12c is mounted to the left back stay 28L by the first supporting member 61. The crossing part 12c is bent to the right from the left in the horizontal direction on the downstream side relative to the position where the crossing part 12*c* is mounted to the left back stay 28L by the first supporting member 61. Thereby, the crossing part 12*c* crosses the vehicle body central line $C_1$ toward the right from the left. The crossing part 12*c* according to this modification crosses the vehicle body central line $C_1$ twice.

In this modification, the first supporting member 61 is formed by at least the bracket 41. The second supporting member 62 is formed by at least the bracket 43 and the bracket 44.

In one or more embodiments discussed above (e.g., FIGS. 3 and 6), the exhaust pipe 12 has the shape made by rolling the pipe once or more and the shape made by bending the pipe so as to be connected to the left rear frame 26L and the right rear frame 26R. However, the exhaust pipe 12 may not have the shape bent as in these embodiments. As an example of other embodiments (e.g., a modification 2), the motorcycle 20 may have the box-shaped exhaust chamber 12*b* provided in the exhaust pipe 12. Members exhibiting the same operations as those of the embodiment are designated by the same reference numerals, and the description thereof is omitted.

Figure 7A:
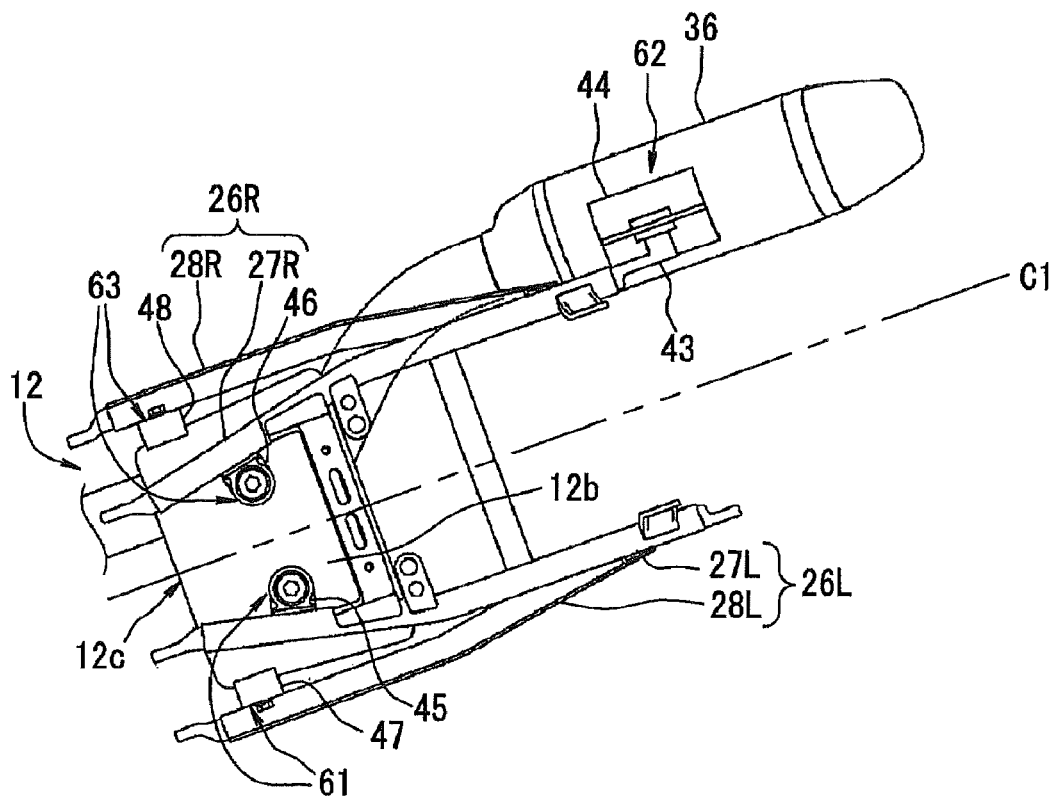
FIGS. 7a-7b illustrate diagrams showing an exhaust pipe or a silencer mounted to a vehicle body frame according to a modification 2, with FIG. 7a showing an upper side (or top) view of a vehicle body of a motorcycle and FIG. 7b showing a side view of the motorcycle in accordance with one or more embodiments of the present invention.
Figure 7B:
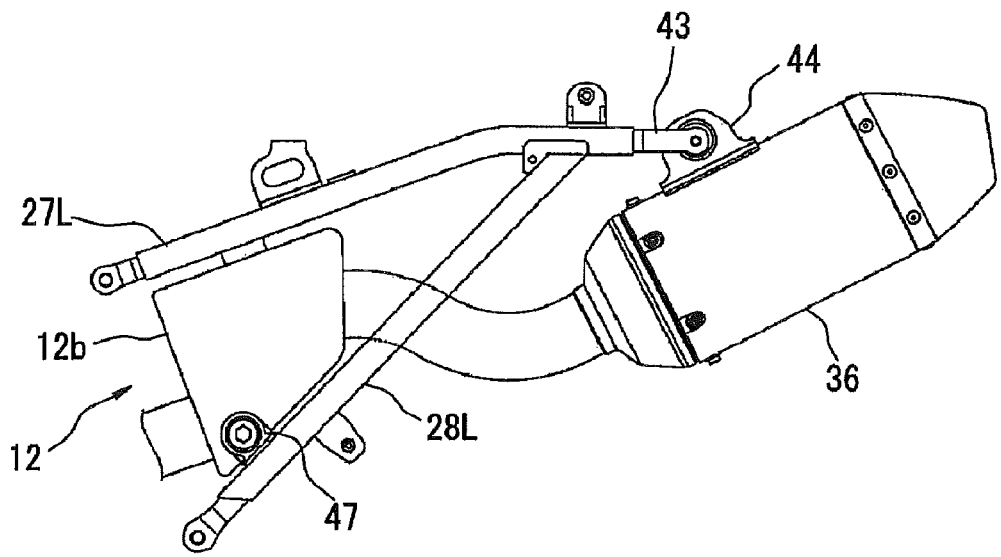

FIGS. 7*a* and 7*b* show the exhaust pipe 12 according to this modification example in accordance with one or more embodiments. The exhaust pipe 12 has the box-shaped exhaust chamber 12*b*. The exhaust chamber 12*b* is mounted to the seat rail 27 via a bracket 45 and a bracket 46. The exhaust chamber 12*b* is mounted to the back stay 28 via a bracket 47 and a bracket 48.

A part of the crossing part 12*c* is formed by the exhaust chamber 12*b*. That is, the exhaust chamber 12*b*, which is disposed between the left rear frame 26L and the right rear frame 26R in the horizontal direction, crosses the vehicle body central line $C_1$. The crossing part 12*c* according to this modification crosses the vehicle body central line $C_1$ substantially once. The term "substantially once" means that the exhaust chamber 12*b* is connected to the right rear frame 26R and the left rear frame 26L so as to straddle the central line of the vehicle body.

In this modification, the first supporting member 61 is formed by at least the bracket 47. Alternatively, the first supporting member 61 is formed by at least the bracket 45. The second supporting member 62 is formed by at least the bracket 43 and the bracket 44. Furthermore, a third supporting member 63 is formed by the bracket 48. Alternatively, the third supporting member 63 is formed by at least the bracket 46. Therefore, in this modification, the right part of the crossing part 12*c* may not be mounted to the right rear frame 26R by the second supporting member 62 but may be mounted to the right rear frame 26R by the third supporting member 63.

As shown in FIG. 7*a*, the silencer 36 is mounted to the right seat rail 27R. However, the silencer 36 may be mounted to the left seat rail 27L. The silencer 36 may be mounted to the right back stay 28R or the left back stay 28L. However, the description of the position or the like of the buffer member of the silencer 36 or exhaust chamber 12*b* provided in the rear frame 26, which may be the same as that of previously discussed embodiments, and therefore the description is omitted and not repeated. As shown in FIG. 7*a*, the exhaust chamber 12*b* is disposed between the left back stay 28L and the right back stay 28R.

As described above, according to this modification, the exhaust chamber 12*b* is mounted to the left rear frame 26L and the right rear frame 26R. The rigidity of the rear frame 26 is highly ensured by providing a rigid member such as the exhaust chamber 12*b* between the left rear frame 26L and the right rear frame 26R.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A motorcycle comprising:
an engine as a power source;
a vehicle body including a vehicle body frame including a front frame supporting at least a part of the engine, a left rear frame connected to the front frame and extending rearward from the vehicle body frame on a left side with respect to a longitudinal center line of the vehicle body, and a right rear frame connected to the front frame and extending rearward from the vehicle body frame on a right side with respect to the longitudinal center line of the vehicle body;
an exhaust pipe connected to the engine, the exhaust pipe including at least a crossing part crossing the longitudinal center line of the vehicle body in a horizontal direction and allowing exhaust gas generated in the engine to flow therethrough;
a first supporting member mounting a left part of the crossing part to the left rear frame on the left side relative to the longitudinal center line of the vehicle body in the horizontal direction; and
a second supporting member mounting a right part of the crossing part to the right rear frame on the right side relative to the longitudinal center line of the vehicle body in the horizontal direction; wherein
the crossing part is rolled once such that the exhaust pipe has a curvature that defines a circle.

2. The motorcycle according to claim 1, wherein the exhaust pipe is connected to a rear part of the engine.

3. The motorcycle according to claim 1, wherein the crossing part of the exhaust pipe includes a silencer arranged to reduce an exhaust sound in the exhaust pipe, and the silencer is connected to one of the left rear frame and the right rear frame via one of the first and second supporting members, and the exhaust pipe is connected to the other of the left rear frame and the right rear frame via the other of the first and second supporting members.

4. The motorcycle according to claim 1, wherein the exhaust pipe is connected to one of the left rear frame and the right rear frame via a buffer member.

5. The motorcycle according to claim 1, wherein the exhaust pipe is disposed between the left rear frame and the right rear frame in the horizontal direction.

6. The motorcycle according to claim 1, wherein the left rear frame and the right rear frame include an upper side rear frame and a lower side rear frame.

7. The motorcycle according to claim 1, wherein the crossing part of the exhaust pipe extends across the longitudinal center line of the vehicle body in the horizontal direction twice.

8. The motorcycle according to claim 1, wherein the horizontal direction is perpendicular to the longitudinal center line of the vehicle body, and the crossing part of the exhaust pipe extends across the longitudinal center line of the vehicle body in a direction substantially parallel to the horizontal direction.

9. The motorcycle according to claim 1, wherein a first portion of the crossing part of the exhaust pipe extends across the longitudinal center line of the vehicle body in the horizontal direction, and a second portion of the crossing part of the exhaust pipe, separate from the first portion of the crossing part, extends across the longitudinal center line of the vehicle body in the horizontal direction.

10. The motorcycle according to claim 9, wherein the horizontal direction is perpendicular to the longitudinal center line of the vehicle body, the first portion of the crossing part of the exhaust pipe extends across the longitudinal center line of the vehicle body in a direction substantially parallel to the horizontal direction, and the second portion of the crossing part of the exhaust pipe extends across the longitudinal center line of the vehicle body in a direction substantially parallel to the horizontal direction.

11. A motorcycle comprising:
an engine;
a vehicle body frame including a front frame supporting at least a portion of the engine, a left rear frame coupled to the front frame and extending rearward on a left side of a longitudinal central line of the motorcycle, and a right rear frame coupled to the front frame and extending rearward on a right side of the longitudinal central line of the motorcycle;
an exhaust pipe coupled to the engine to direct exhaust gas from the engine, the exhaust pipe including at least a crossing part that crosses the longitudinal central line of the motorcycle;
a first supporting member mounting a left part of the crossing part to the left rear frame; and
a second supporting member mounting a right part of the crossing part to the right rear frame; wherein
the crossing part is rolled once such that the exhaust pipe has a curvature that defines a circle.

12. The motorcycle according to claim 11, wherein the exhaust pipe is coupled to a rear part of the engine.

13. The motorcycle according to claim 11, wherein the crossing part of the exhaust pipe includes a silencer adapted to reduce an exhaust sound in the exhaust pipe, and the silencer is coupled to the left rear frame or the right rear frame via one of the first and second support members and the exhaust pipe is coupled to an opposite one of the left rear frame or the right rear frame via the other of the first and second support members.

14. The motorcycle according to claim 11, wherein the exhaust pipe is coupled to the left rear frame or the right rear frame via a buffer member.

15. The motorcycle according to claim 11, wherein the exhaust pipe is disposed between the left rear frame and the right rear frame in a horizontal direction.

16. The motorcycle according to claim 11, wherein the left rear frame and the right rear frame each include an upper side rear frame and a lower side rear frame.

17. The motorcycle according to claim 11, wherein the crossing part of the exhaust pipe extends across the longitudinal central line of the motorcycle twice.

18. The motorcycle according to claim 11, wherein the crossing part of the exhaust pipe extends across the longitudinal central line of the motorcycle in a direction substantially perpendicular to the longitudinal central line of the motorcycle.

19. The motorcycle according to claim 11, wherein a first portion of the crossing part of the exhaust pipe extends across the longitudinal central line of the motorcycle, and a second portion of the crossing part of the exhaust pipe, separate from the first portion of the crossing part, extends across the longitudinal central line of the motorcycle.

20. The motorcycle according to claim 19, wherein the first portion of the crossing part of the exhaust pipe extends across the longitudinal central line of the motorcycle in a direction substantially perpendicular to the longitudinal central line of the motorcycle, and the second portion of the crossing part of the exhaust pipe extends across the longitudinal central line of the motorcycle in a direction substantially perpendicular to the longitudinal central line of the motorcycle.

* * * * *